Feb. 9, 1937.       J. W. PEASE       2,070,311
FRUIT CORING MACHINE
Filed Dec. 19, 1930       9 Sheets-Sheet 6

INVENTOR
John W. Pease
BY
his ATTORNEY

Feb. 9, 1937.  J. W. PEASE  2,070,311
FRUIT CORING MACHINE
Filed Dec. 19, 1930  9 Sheets-Sheet 7

INVENTOR
John W. Pease
BY
his ATTORNEY

Feb. 9, 1937. J. W. PEASE 2,070,311
FRUIT CORING MACHINE
Filed Dec. 19, 1930 9 Sheets-Sheet 8

Patented Feb. 9, 1937

2,070,311

UNITED STATES PATENT OFFICE 2,070,311

FRUIT CORING MACHINE

John W. Pease, Rochester, N. Y.

Application December 19, 1930, Serial No. 503,496

6 Claims. (Cl. 146—52)

My present invention relates to fruit machines and more particularly to apparatus for trimming or excavating the centers of such fruits as apples having inedible seeds and seed cells on their interior which it is desirable to remove in preparing the fruit for all purposes and particularly in preparation for slicing and drying, canning and the making of apple-sauce. It has for an object to provide a simple, compact, convenient, efficient and durable machine of this character that will handle the fruit rapidly and with a minimum loss of edible pulp incident to the removal of the objectionable parts. A further object of the invention is to provide a machine that will automatically adapt itself to and work with uniformity upon fruit articles of different sizes in pursuit of the attainment of the last mentioned object. A still further object of the invention is to provide an improved slicer and one so combined with the mechanism above referred to as to work in perfect harmony therewith and successively with reference thereto without interfering with the previous operation or slowing it up in any way.

To these and other ends, the invention resides in certain improvements and combinations of parts, all as will be hereinafter more fully described, the novel features being pointed out in the claims at the end of the specification.

In the drawings.

Similar reference numerals throughout the several views indicate the same parts.

I have shown and will describe my invention in connection with its specific embodiment in a machine for removing the seeds and seed cells of apples and delivering them sliced in sectors taken longitudinally of their axis through the stem and blow ends as the machine comprises this combination of treatments and functions as offered for commercial purposes, but the slicing mechanism will be but briefly treated of herein as it forms the subject matter of a co-pending application, Serial No. 557,342, filed December 19, 1930, now Patent No. 2,015,409, granted September 24, 1935, constituting a division hereof. I will first give a general description of the functions of the machine before describing the structure and details with reference to the drawings.

The apples as they come to the machine have preferably been freshly pared and cored, that is, cored in the ordinary sense of the word in this art, which means that a uniform bore has been made through the center, removing the stem and blow and the center of the core. The seed cells radiating from this axis at approximately the geometrical center of the apple occupy a generally globular portion of the interior, so that the coring spoon does not reach the outer tough edges of the cell walls, which remain in the apple, and it is the removal of these by a further operation or treatment that is the problem toward the solution of which this invention and machine is addressed.

The cored apple is placed upon the spindle of a feeding device that swings from a clear and convenient feeding position to one in alinement with a fixed spit or holder. In its next operation, it impales the apple on the spit with which is associated a semi-circular knife of the general curvature of the seed cell body and fixed to an intermittently rotating part. In advance of this knife, as the apple comes upon the spit, is a grooving device that removes a small portion of the interior wall of the core hole to make way for the knife which is then at rest. Subsequently, the knife rotates hollowing out the center of the apple and removing all the fragments of the seed cells, after which the apple is doffed, the curved knife slipping back through the same groove in the core wall.

When so doffed, the apple is received upon an impaling pin or holder that operates to force by successive swinging and rectilinear movements through a slicing spider that ends the dual operations of seed celling and slicing. The parts are so timed that while the celled apple is going through the slicing operation, the next following apple with practically the same movement is being fed and celled, so that after the slicer pin returns empty, it is again in position to receive this apple in turn, at which time the feeder goes out again into receiving position.

Although a large apple has a long core and a small apple has a relatively shorter core, they nevertheless are substantially uniform with respect to two characteristics. One of them is the distance or thickness of pulp from both the blow and stem to the seed cell structure, and the other is the transverse diameter of the latter. With my invention, a curved rotatable knife blade is made to effectively seed cell a small apple without axial movement relatively thereto and to effectively seed cell the large apple through an axial movement occurring during the rotary movement of the knife without waste of pulp in either instance, such selective operation of the knife being controlled automatically by the fruit itself.

Referring more particularly to the drawings, 1 indicates generally an upright rectangular frame, within which the entire mechanism is hung. A main driving shaft 2 provided with pulleys 3 and rotating continuously is mounted transversely of this frame from side to side, but the other shafts, axes and centers of rotary or swinging movement are principally vertical. I shall first describe the elements and instrumentalities that actually handle and work upon the apple with their respective functions and later describe the manner in which they are driven in synchronized or relatively timed movement. In other words, I will first follow the course of the apple through the celling and slicing operations.

Referring, for instance, to Figs. 1, 3, 11, and 13, there is mounted at the left front of the main frame on a cross frame 4 with the aid of a lower bearing bracket 5 a tubular shaft 6. It is supported at its upper end in its bearing boss 7 by a pinion 8 secured thereto and that rests on the latter. Below the bearing, it is provided with a set collar 9. At its lower end, it extends through a fixed sleeve or extended bushing 10 carried by the bearing bracket 5 and near the lower tip of the sleeve, it has secured to it, as by the screw 11, a relatively fixed but detachable arcuate knife blade 12 that curves out laterally. It will be seen from this that the gear 8 will revolve the knife.

Figures 11, 12, 13:
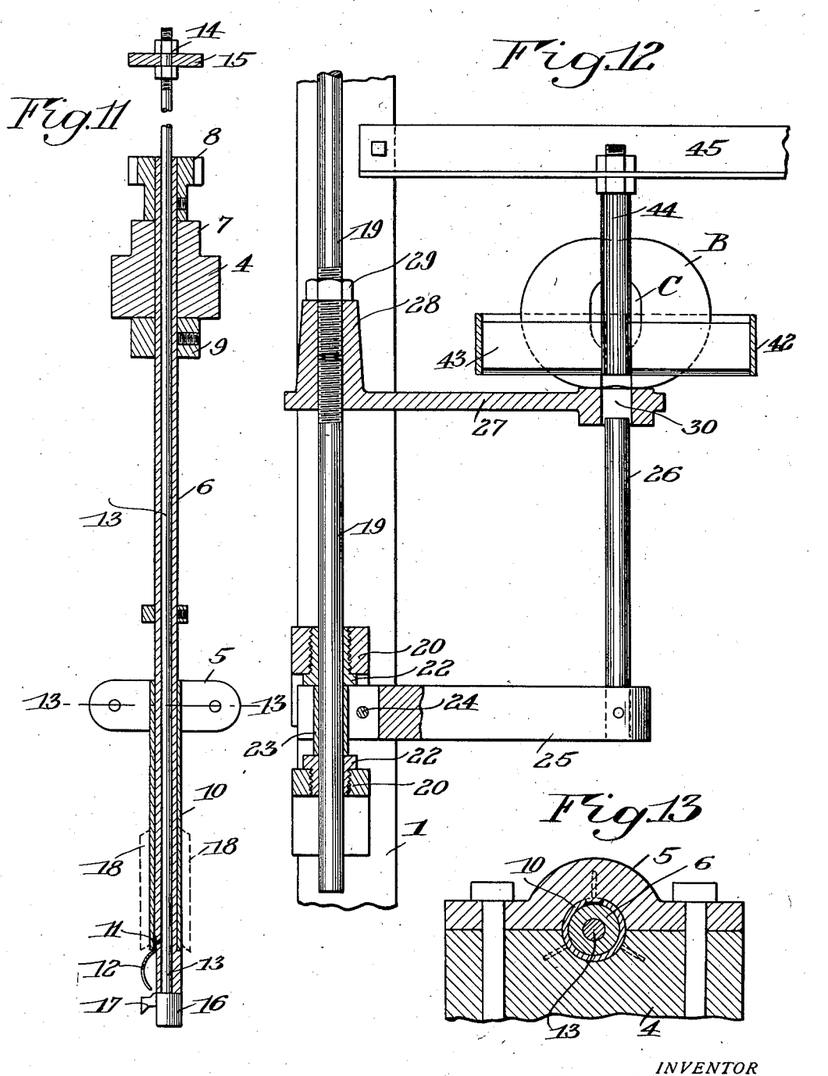
Fig. 11 is an enlarged detailed section, partly broken away, taken centrally and vertically through the bearings of the knife shaft.
Fig. 12 is a vertical central section, enlarged, through the bearings or mountings of the fruit handling arm.
Fig. 13 is a further enlarged horizontal fragmentary section taken on the line 13—13 of Fig. 11.

Within the tubular shaft 6 is a fixed rod 13 supported rigidly by nuts 14 at its upper end in a bracket 15 at the top of the frame 1. At its lower tip is an enlargement 16 abutting the lower end of the rotary tubular shaft 6. A chisel-like grooving knife 17 (Fig. 22) of at least the width of revolving knife 12 projects from the enlargement 16 normally in alinement with the said revolving blade 12 and having lateral projection equal thereto, all as shown in Fig. 11. Just above knife 12, the lower end of the bearing sleeve 10 is fitted with a plurality of thin, longitudinally extending, radially projecting fins or blades 18.

Figure 7:
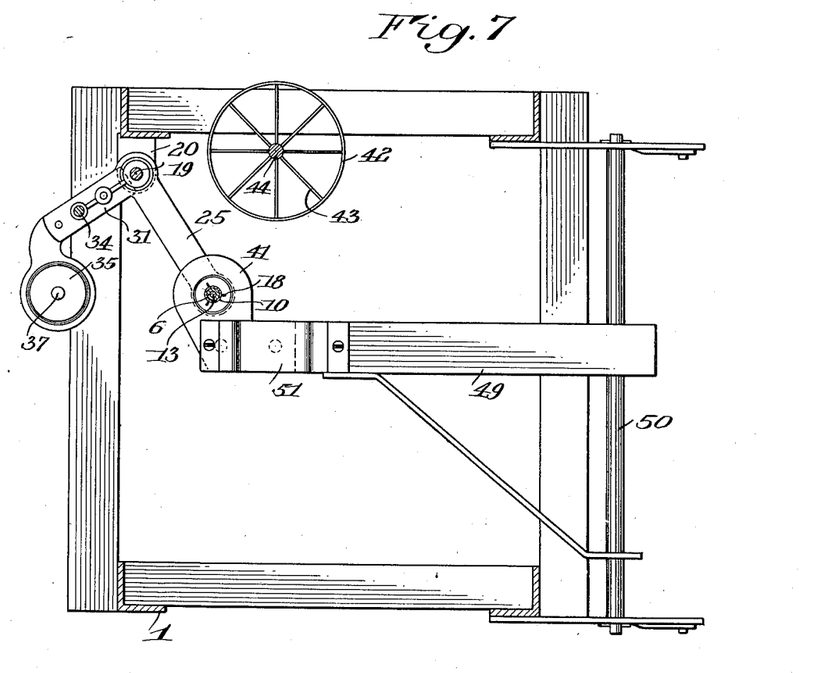
Fig. 7 is a horizontal sectional view through the frame at a lower point, showing the fruit handling elements in detail in top plan.
Figure 8:
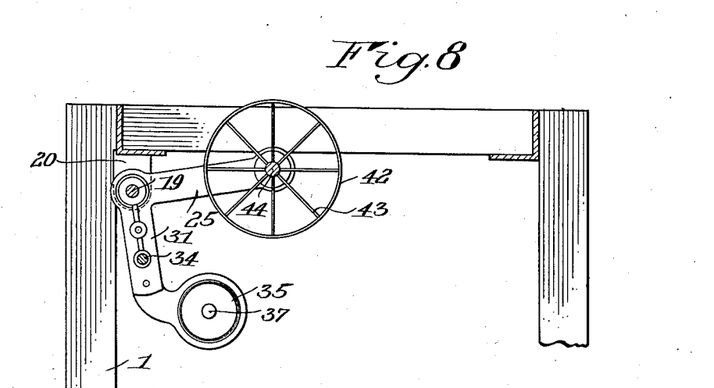
Fig. 8 is a fragmentary view showing parts illustrated in Fig. 7 in another position.

Referring now additionally to Figs. 7, 8, and 12, there is also mounted in the left front corner of the frame 1 parallel with tubular shaft 6 a vertically reciprocatory rock shaft 19. It has bearings in lower brackets 20 and an upper bracket 21 on the frame upright. The lower brackets 20 are fitted with bushings 22 between which is confined a sleeve 23 free on the shaft. Clamped to this sleeve by a bolt 24 is an arm 25 fitted with an impaling pin or post 26 at its free end. This is the arm which swings the apple, after seed celling, from the position of that operation to the slicing position. Another coextensive arm 27 overlying the arm 24 is fixed to rock shaft 19 to swing and reciprocate therewith. In fact, the shaft 19 is preferably made in parts, as shown in Fig. 12, the ends of which are threaded into a boss 28 on arm 27 and locked together and thereto by a jam nut 29. The outer end of arm 27 has an opening 30 fitting over and riding on the impaling pin or post 26, through the medium of which the arm 25, free on shaft 19, may be swung in an arc by arm 27 fixed to rock shaft 19, while arm 27 is also free to slide up and down on impaling pin 26 with the reciprocations of shaft 19.

Figure 3:
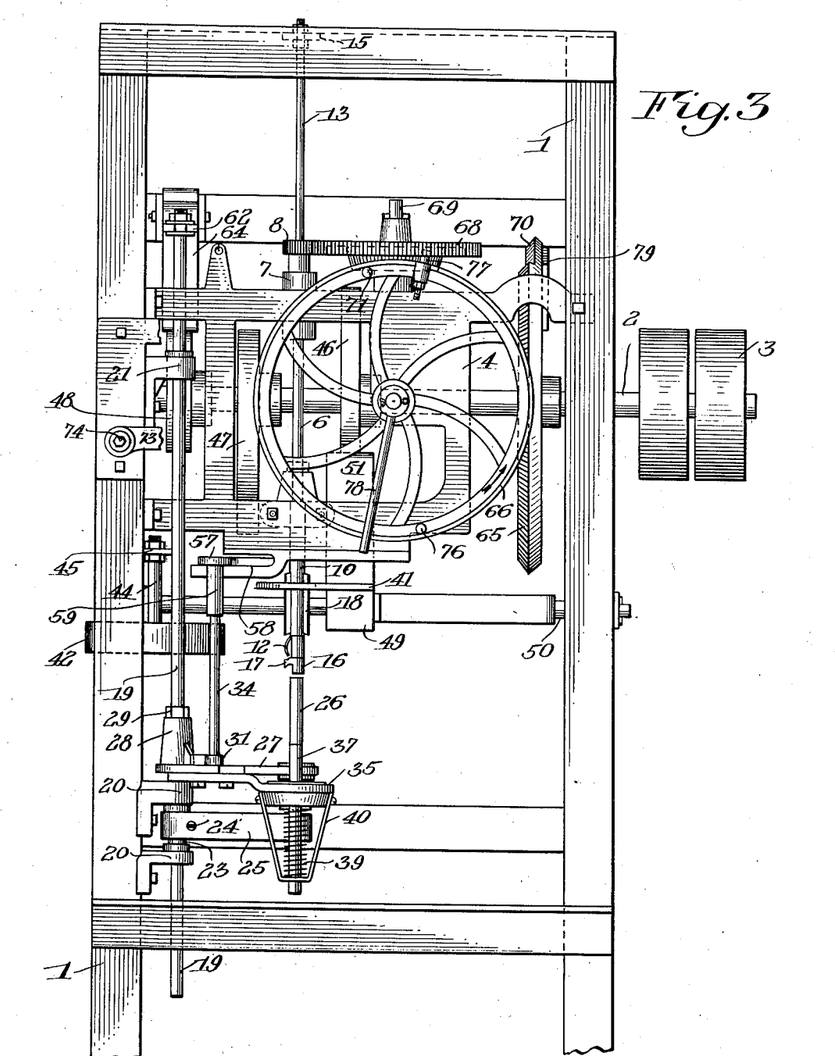
Fig. 3 is a view similar to Fig. 1 with the parts in another position in the cycle of operation.
Figures 20, 21, 22:
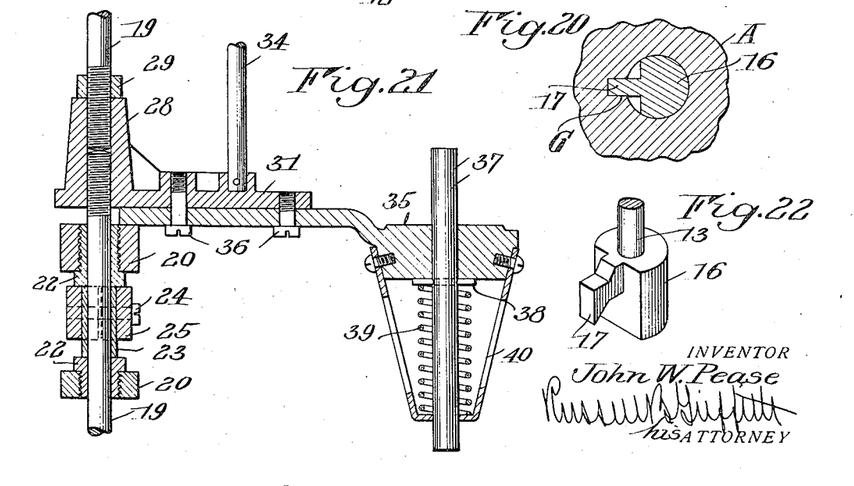
Fig. 20 is a fragmentary section on the line 20—20 of Fig. 14.
Fig. 21 is an enlarged section taken through the feeding arm and its mountings and bearings.
Fig. 22 is an enlarged perspective view of the grooving knife on the celling head which makes way for the celling knife.

Above the upper bearing bracket of the pair 20, there is fixed to the shaft 19 at right angles to the arms 25 and 27 an arm 31 (see additionally Fig. 21). The shaft 19 is also parted at this point with the ends of the parts threaded into a boss 32 on arm 31 and secured by jam nut 33. This arm 31 therefore both swings and reciprocates with the shaft 19. In fact, the shaft 19 receives its rocking movement through the medium of this arm which is swung in an arc by means of a post 34 fixed thereto and connected for actuation in a manner that will be hereinafter described. An apple feeding holder 35 is secured to the arm 31 by screws 36 as an extension thereof and hence swings with it from the receiving position of Figs. 1 and 7, for instance, to the delivering position of Figs. 1, 5, and 8 beneath the celling shaft 6. As best shown in Figs. 3 and 21, the holder 35 consists, in the present instance, of merely a circular table, from the center of which rises a centering pin 37. This pin is yielding and may be depressed. It extends through the table with a cross pin 38 fixed to it therebelow to limit its upward projection under the influence of a compression spring 39 supported in a depending cage 40 secured to the holder.

Figure 1:
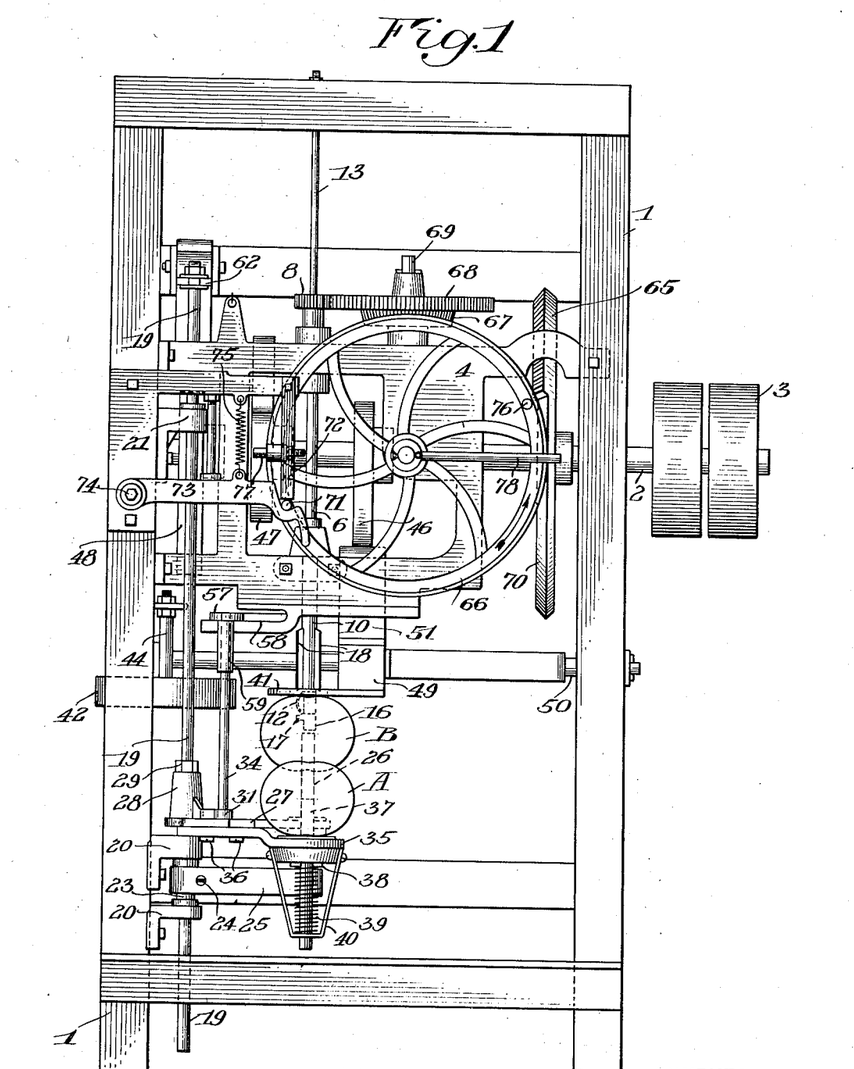
Fig. 1 is a front elevation with the bottom of its frame broken away of a seed removing or celling machine constructed in accordance with and illustrating one embodiment of my invention, the parts being in as near a normal position as is attained, as there is no period of rest with respect to all of the operations.
Figure 5:
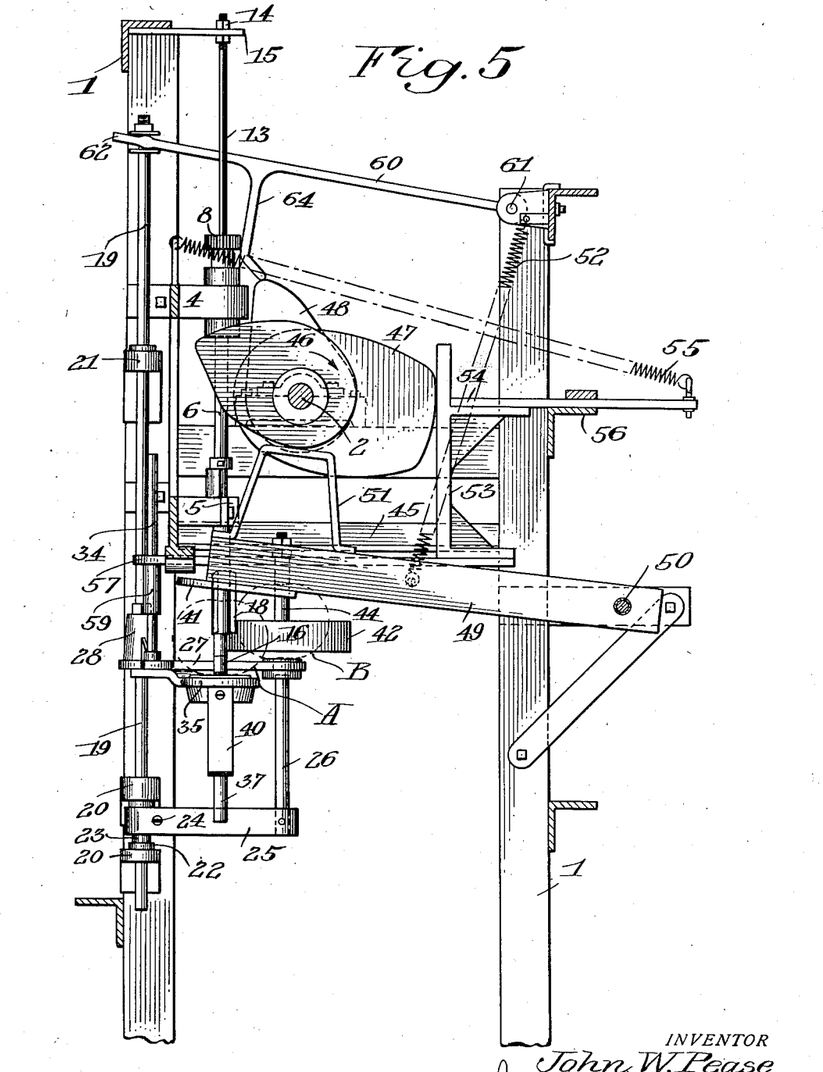
Fig. 5 is a section similar to Figs. 2 and 4, showing the parts in another position in the cycle during which the fruit is being sliced.
Figures 6, 9, 10:
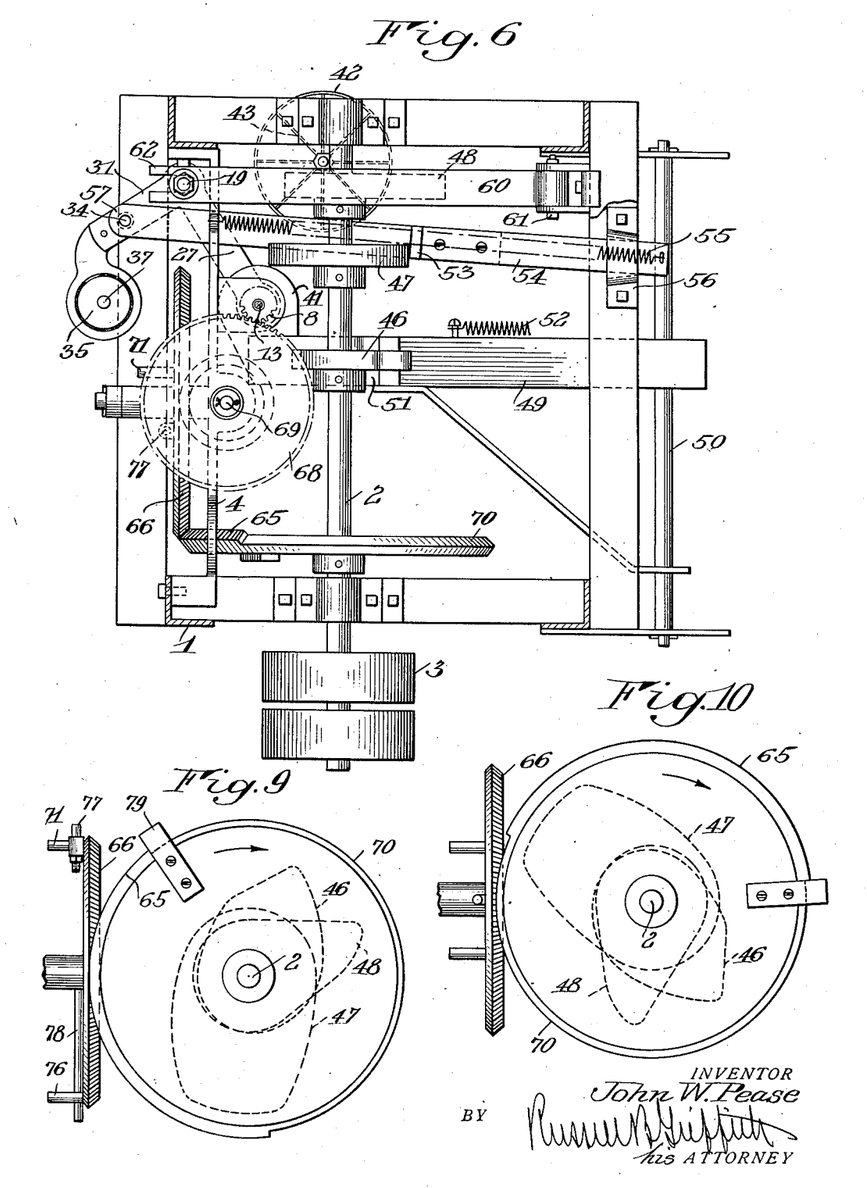
Fig. 6 is a top plan view of the working mechanism taken in section through the frame.
Fig. 9 is an end view of the drive shaft with driving pulleys removed, illustrating its connection with the driven element in one position.
Fig. 10 is a view similar to Fig. 9, showing the parts in another position during the cycle.

With the foregoing description of the devices that actually handle the apple in its complete treatment by the machine, it is believed that a description of the course of the apple or a succession of apples through the machine can now be understood. It is as follows:

The feeding arm and table being in its forward normal position of Figs. 1, 6, and 7, the operator, standing at the front of the machine, places a cored and preferably peeled apple on the pin 37 and table 35. Properly timed actuating mechanism through the medium of the post 34 on the feeding arm swings the latter (rocking the shaft 19) rearwardly to the position of Figs. 3 and 8, in which the pin 37 and the apple are centered in alinement with and below the spit 10 on the celling head carrying the groover 17 and knife 12 associated with the fixed fins 18. Next, rock shaft 19 slides upwardly in its bearings, carrying the feeding device bodily with it in a stroke of sufficient amplitude to impale the apple (indicated thus far at A in dotted or full lines in several figures) non-rotatably on the spit, as shown in Fig. 5. This upward movement is definite and constant, the pin 37 abutting and being depressed by the end 16 of the fixed rod 13 and the apple sliding accurately from one device to the other, and while it is obvious that a large apple will be forced farther up on the holding fins 18 of the head than will a small apple, it is to be particularly borne in mind that the distance from the blow end to the knife 12 will always be the same, no matter what the size of the apple, as shown in Fig. 14.

Figure 14:
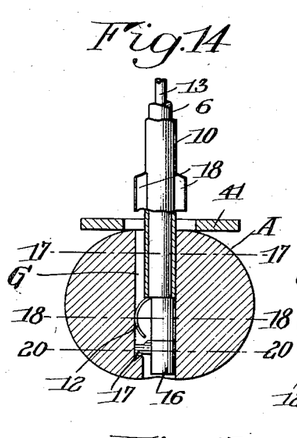
Fig. 14 is an enlarged detailed section through the celling head, showing the manner in which the fruit is held thereon just before the operation of the celling knife.
Figures 15, 16:
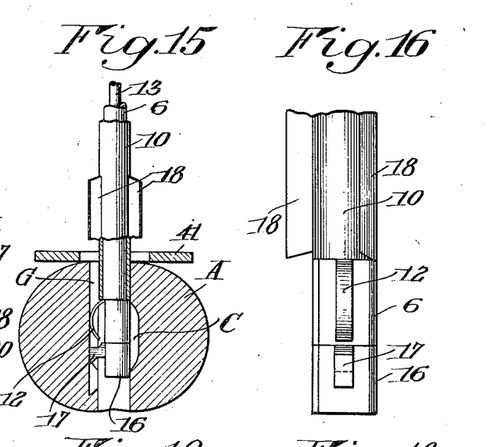
Fig. 15 is a view similar to Fig. 14 at the completion of the celling operation by the knife.
Fig. 16 is a further enlarged fragmentary elevation of the seed celling head taken from a point at the left of Figs. 14 and 15.
Figure 17:
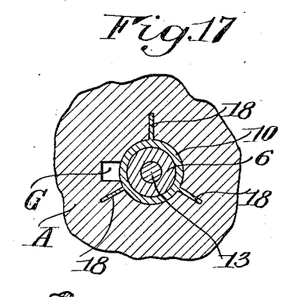
Fig. 17 is a fragmentary enlarged horizontal section taken on the line 17—17 of Fig. 14.
Figures 18, 19:
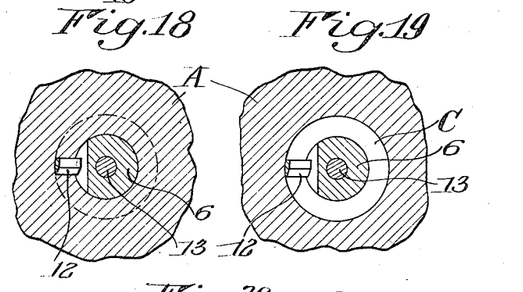
Fig. 18 is a similar view taken on the line 18—18 of Fig. 14.
Fig. 19 is also a fragmentary section taken on the line 18—18 of Fig. 14 but at another point in the cycle of operation.

As also shown in Fig. 14, during this impalement, the fixed cutter 17 precedes the entrance of the knife 12 into the interior of the apple, the two being in alinement and the knife being at rest, and the former cuts the groove G in the wall of the core hole to effect the unrestricted entrance of the knife. Immediately, the knife 12 revolves under a timed rotation of the hollow shaft 6 and removes the seed cells, together with any seeds remaining within its path. The knife is halted again, finally, in its original position of Fig. 11 in alinement with cutter 17, so that the apple may be withdrawn with these elements receding through the same groove G.

Figure 4:
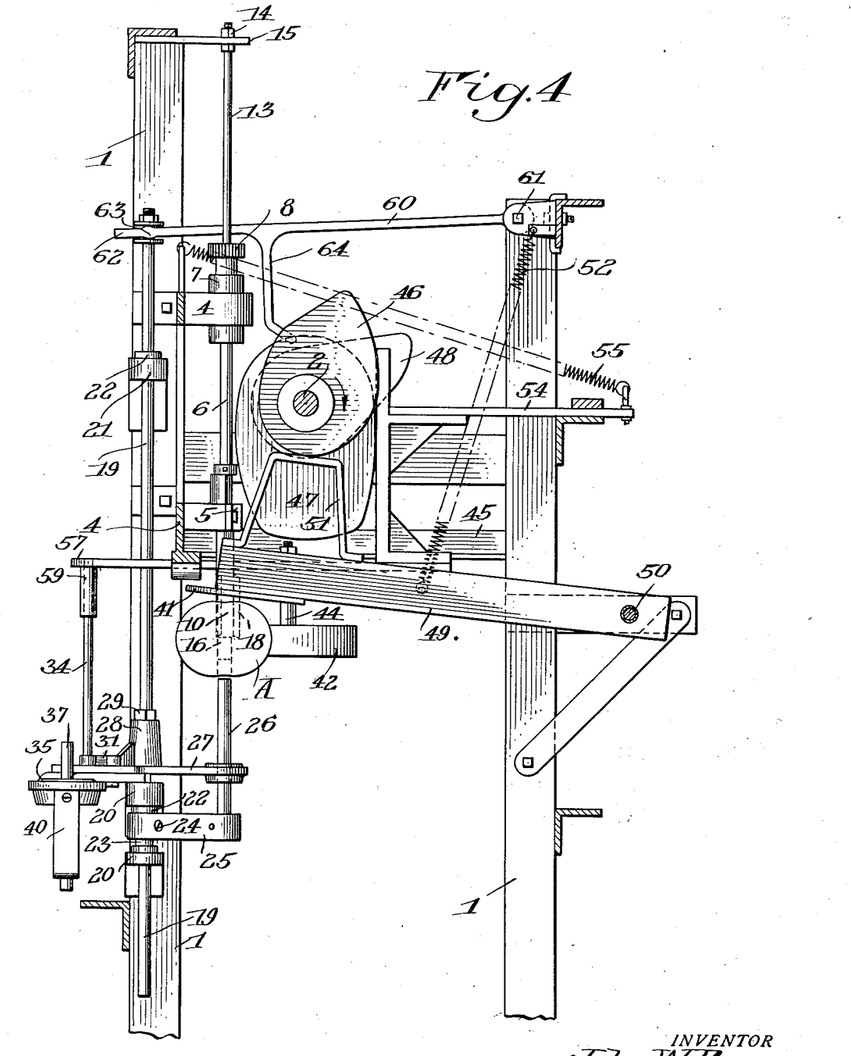
Fig. 4 is a vertical central section similar to Fig. 2 with the parts in the same position as shown in Fig. 3.

This withdrawal of the celled apple A is effected by means of a doffer 41 consisting, in the present instance, of a plate surrounding the celling head or having an opening through which the head projects. By the time this doffer, from the normal position of Fig. 4, comes down in contact with the top of the apple, as in Fig. 14, the shaft 19 has been rocked in reversed movement and the feeding arm 31 and feeding table 35 carried back to its normal position of Fig. 4, ready to receive the next apple. This brings arm 25 carrying pin 26, which always swings in unison therewith, into the position in alinement with the celling head previously occupied by centering pin 32, as shown in Fig. 4. The apple is hence transferred to the position B by the doffer on pin 26. As the feeding arm makes its next movement rearwardly to feed the new apple A, the preceding apple of position B is correspondingly swung on arm 25 to the position of Fig. 5. It is now below and in alinement with the center of a slicing spider 24 carrying radial blades 43 and mounted in fixed position on a vertical rod 44 bolted to a rail 45 on frame 1. The arm 27 associated with arm 25, but fixed to rock shaft 19, underlies the apple on which the latter in fact rests. As soon as the above alinement is consummated, the rock shaft 19 is drawn upwardly and arm 27 acts as a doffer to lift the apple off of pin 26 and force it through the knives of the spider 42, thus slicing it into sectors which are caught in a suitable receptacle.

Concurrently with this, of course, apple A is being alined with and thrust upon the celling head, as previously described. And returning to the celling operation, I will explain how my machine automatically cuts short cores from small apples and long cores from large apples without any manual adjustments or changes of the parts.

Referring particularly to Figs. 4 and 5 and assuming that the apple A shown in these figures is a relatively large one, the doffer 4 comes into contact with the top thereof and moves from the position of Fig. 4 to that of Fig. 5, while the celling knife 12 is still revolving, that is, while the apple is slipping off the head. The result is that the cut of the knife is elongated, as indicated at C, longitudinally of the axis and the whole of the relatively long core is removed. The timing is such, however, that the hollow shaft 6 and the knife 12 come to rest as the doffer 41 approaches to a point a predetermined distance from the knife, which is the average distance from the end of the core to the top of the apple in apples of all sizes.

In the case of a relatively small apple, on the other hand, the doffer 41 comes down idly from its position of Fig. 4 to that of Fig. 5, so that by the time it touches the apple at all the knife 12 has come to rest in the groove G and the apple is removed after the small or short core has been completely removed with a spherical cut by the knife without relative movement of the latter and the apple.

The actuating mechanism, by means of which the various movable parts hereinbefore referred to are synchronized to act in timed relation and effect the general cycle of operation, will now be described.

Referring first more particularly to Fig. 6 showing them in plan view, there are secured to the constantly rotating drive shaft 2 three cams 46, 47 and 48, the relative shapes of which are best shown in full lines in Fig. 4 and in dotted lines in Figs. 9 and 10. The function of the cam 46 is to operate the doffer plate 41 which is carried by an arm 49 rocking vertically on a pivot 50 on a bracket at the rear of the machine to give it length and hence less curvature to the doffer plate itself. A yoke bracket 51 on top of the arm makes contact with cam 46 against which it is held and by which it is raised through the tension of a spring 52 connected to the arm and to the frame. In Fig. 3, the arm contact is just leaving the low point of the cam, while in Fig. 2, it is on the high point, after having completed the doffing movement and transferred the apple B from the celling head to the slicer pin.

Cam 47 is connected to communicate the swinging movement to the feed arm 31 and the slicer arm 25. To this end, it engages the vertical face 53 of a reciprocatory frame 54 held thereagainst and movable forwardly under the influence of a spring 55 connected to this frame and to a fixed part. It is guided at the rear in a bracket 56 on the rear of the machine, while a forward extension 57 pivots on the post 34, heretofore described as fixed on feeder arm 31. The arcuate movement of this arm prevents a true reciprocatory movement of the frame 54—57, but it is substantially rectilinear because of the length of the frame and the variable is provided for by a slotted bearing 58 in the cross frame 4, in which extension 57 rests, as clearly shown in the front elevations. The pivotal connection with post 34 is through a bearing sleeve 59 fixed to extension 57, so that when the feeding arm rises, as in Fig. 5, to impale the apple upon the feeding head, the post 34 will slide through its actuating frame extension.

Figure 2:
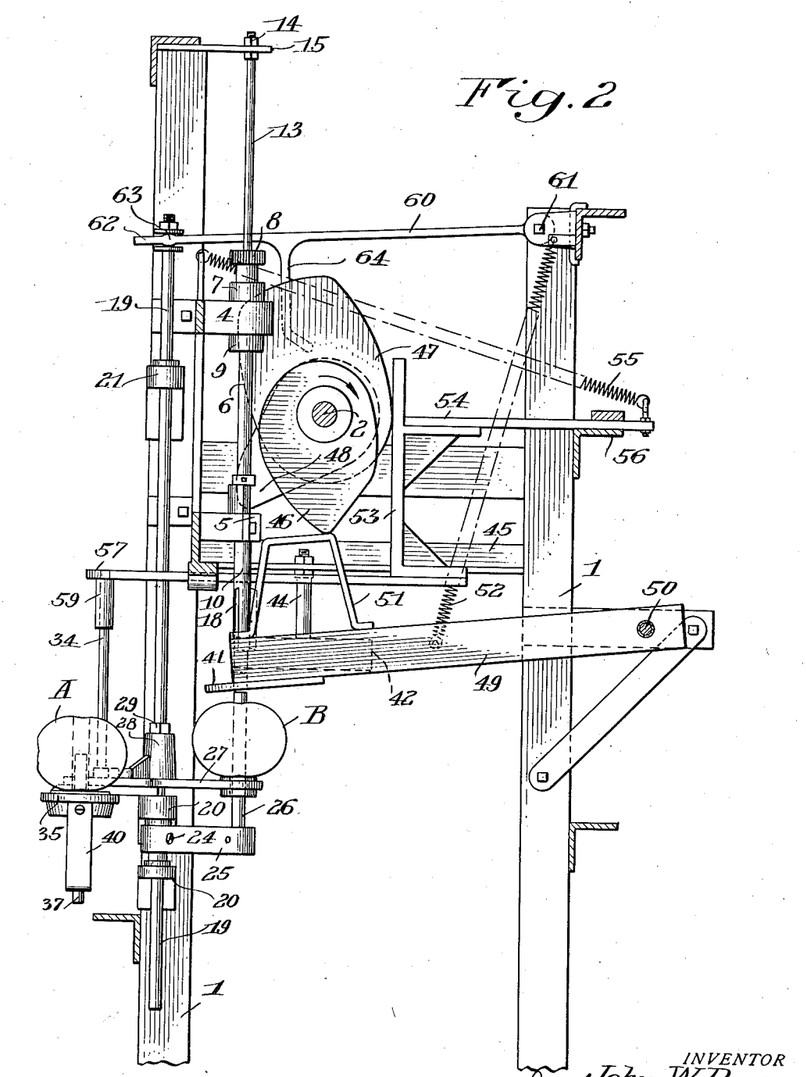
Fig. 2 is a substantially central section taken from front to rear through the machine, showing the fruit handling elements for feeding and for transferring to the slicing element in elevation.

The cam 48 serves to raise the lower rock shaft 19 to carry the feeder arm 31 and the slicer arm 27 toward and from the celler head and the slicer respectively and in unison, as described. To this end, a vertically rocking lever 60 pivoted to the rear of the frame 61 has a bifurcated forward end 62 embracing shaft 19 and making a rocking bearing therewith at 63. The arm and shaft lower themselves by gravity, in the present instance, and contact is made with the cam 48 through a depending finger 64 on the under side of the arm riding thereon. In Fig. 2, the arm and shaft are shown lowered, the cam having left contact, while in Fig. 5, they are raised to the maximum, the finger riding on the high point of the cam.

The intermittent rotations of the tubular knife shaft 6 carrying the celling knife 12 are effected through the medium of a cycle member. This consists (Figs. 1, 6, 9, and 10) essentially of an interrupted gear 65 on drive shaft 2 meshing with a gear wheel 66 turning on a stud on cross frame 4. The teeth on the latter gear are continuous and they mesh with a miter pinion 67 fixed to a gear 68 turning on a stud 69 on top of the cross frame 4. Gear 68 in turn meshes with pinion 8, before described, fixed to the hollow shaft 6 that revolves the celler knife 12. Thus, any movement of gear 66 will revolve the knife.

As has been before stated, it is difficult to name any normal position of the parts of the machine, as one or another is in motion all of the time, but for the purpose of explaining this knife operating mechanism, we may for convenience say that the normal position is that of Fig. 1 because the apple A has just been placed on the feeder, while apple B is being doffed from the celling head. As also shown in Fig. 10, the gear 65 is out of mesh with gear 66 and, turning in the direction of the arrow, its blank portion 70 is passing gear 66. The latter being, therefore, at rest, the knife 12 is at rest and gear 66 is temporarily held in this position by a pin 71 projecting laterally from its perimeter engaging between two spring latches 72 and 73. The first mentioned of these latches is a spring finger secured to cross frame 4, under which pin 71 rides with the latch finger snapping in behind it to prevent retrograde movement. Latch 73 is a spring arm pivoted to the frame at 74 and yieldingly engaging pin 71 against forward or counterclockwise movement of gear 66 under the influence of a spring 75 connected to the latch arm and to a fixed part. Each half rotation of gear 66 effects and concludes a celling movement of the knife 12 which, as before stated, is at rest while pin 71 is held between the latches. Diametrically opposite pin 71 is, therefore, provided a similar pin 76 which acts in the same way with respect to the latch. In rear of each pin in the direction of rotation is an abutment consisting of pins 77 and 78 projecting radially beyond the perimeter of gear 66 and beyond the outer face of interrupted gear 65. On said face of the latter at the point at which the segmental series of teeth begin is a similarly radially projecting trip 79. Starting at the position of Figs. 1 and 10, it will be noted that pin 78 is at rest in the path of trip 79. When the latter reaches it, the cams on the drive shaft 2 have performed their respective functions occurring while the knife 12 is at rest and it is time for the operation of the knife. The trip 79 gives the pin a kick and throws the teeth of gear 65 into mesh with gear 66 forcibly releasing latch 73 until pin 78 and pin 71 exchange positions, whereupon there is another period of rest and so the cycle is repeated.

I claim as my invention:

1. In a fruit celling machine, the combination with a relatively fixed holder upon which a cored fruit is adapted to be impaled, of a relatively fixed grooving device arranged in advance thereof and adapted to chisel a channel in the inner wall of the fruit as the latter is presented to the holder, a rotary celling knife intermediate the two elements and normally in alinement with the grooving device, means for intermittently driving the celling knife and automatically stopping it in alinement with the grooving device, and a doffer cooperating with the holder and synchronized with the knife driving means to remove the fruit axially from the holder in a single movement, part of which occurs during the rotation of the knife and the other part while the knife is at rest.

2. In a fruit celling machine, the combination with a relatively fixed holder upon which a cored fruit is adapted to be impaled, of a relatively fixed grooving device arranged in advance thereof and adapted to chisel a channel in the inner wall of the fruit as the latter is presented to the holder, a rotary celling knife intermediate the two elements, means for intermittently driving the celling knife and automatically stopping it in alinement with the grooving device, a feeding device having a uniform amplitude of movement and synchronized with the driving means to present a fruit to the holder while the knife is at rest, and a doffer also synchronized with the driving means to doff the fruit in an axial direction, said doffer also having uniform amplitude of movement whereby it engages a large fruit during the rotation of the knife and a small fruit after the knife has come to rest.

3. In a fruit celling machine, the combination with a fruit holder adapted to support a cored fruit, and a celling knife support adapted to occupy the core hole of the fruit while on the holder and embodying a blade, both the latter and its support having fixed lateral projection, of means for rotating one of said elements relatively to the other, means for presenting a cored apple concomitantly to the celling knife support and fruit holder, and separate additional means for effecting a relative axial movement of the fruit and the blade during the said period of relative rotation while the blade is cutting the cell.

4. In a fruit celling machine, the combination with a fruit holder adapted to support a cored fruit, and a celling knife support adapted to occupy the core hole of the fruit while on the holder and embodying a blade having fixed lateral projection, of means for rotating one of said elements relatively to the other, means for presenting such fruit to the holder from one direction and a doffer independent of the presenting means for initially engaging the fruit from the opposite direction and effecting a relative axial movement of the fruit and the blade during the said period of relative rotation while the blade is cutting the cell, said doffer acting ultimately to remove the fruit from the holder.

5. In a fruit celling machine, the combination with a non-rotatable fruit holder adapted to support a cored fruit, means for presenting such fruit thereto from one direction, and a relatively rotary celling knife support adapted to occupy the core hole of the fruit while on the holder and embodying a blade, of means for intermittently rotating the knife support and blade, and means independent of the presenting means synchronized with the latter to engage the fruit from the opposite direction and move the fruit axially on the holder, partly while the blade is rotating within the fruit and partly while it is at rest, said last mentioned means having a lost motion contact with small fruit from the opposite direction to move independently thereof while such fruit is on the holder.

6. In a fruit celling machine, the combination with a fruit holder adapted to support a cored fruit, means for presenting such fruit thereto from one direction, a celling knife support adapted to occupy the core hole of the fruit while on the holder and embodying a blade having fixed lateral projection, and means for intermittently rotating one of said elements relatively to the other, of means independent of the presenting means engaging the fruit from the opposite direction for effecting an axial movement of the blade relatively to the knife, said means being synchronized to impart said movement partly while the blade is rotating within the fruit and partly while it is at rest, said last mentioned means having a lost motion contact with small fruit from the opposite direction to move independently thereof while such fruit is on the holder.

JOHN W. PEASE.